(12) United States Patent
Hampel et al.

(10) Patent No.: US 8,949,055 B2
(45) Date of Patent: Feb. 3, 2015

(54) MEASUREMENT DEVICE, PARTICULARLY ENERGY COUNTER AND METHOD FOR RECOGNITION OF MANIPULATIONS

(75) Inventors: Hermann Hampel, Grosshabersdorf (DE); Gerd Bumiller, Furth/Vach (DE)

(73) Assignee: iAd Gesellschaft für Informatik, Automatisierung und Datenverarbeitung mbH, Großhabersdorf (DE)

( * ) Notice: Subject to any disclaimer, the term of this patent is extended or adjusted under 35 U.S.C. 154(b) by 256 days.

(21) Appl. No.: 13/130,088

(22) PCT Filed: Nov. 18, 2009

(86) PCT No.: PCT/EP2009/008225
§ 371 (c)(1),
(2), (4) Date: May 19, 2011

(87) PCT Pub. No.: WO2010/057631
PCT Pub. Date: May 27, 2010

(65) Prior Publication Data
US 2011/0224935 A1    Sep. 15, 2011

(30) Foreign Application Priority Data

Nov. 19, 2008 (DE) .......................... 10 2008 058 264

(51) Int. Cl.
*G01D 18/00* (2006.01)
*H04L 9/32* (2006.01)
*G01D 4/00* (2006.01)

(52) U.S. Cl.
CPC .............. *H04L 9/3297* (2013.01); *G01D 4/004* (2013.01); *H04L 9/3247* (2013.01); *Y02B 90/242* (2013.01);

(Continued)

(58) Field of Classification Search
CPC ...................................................... G01D 4/004
USPC ........................................ 702/85, 61; 705/63
See application file for complete search history.

(56) References Cited

U.S. PATENT DOCUMENTS 6,538,577 B1 * 3/2003 Ehrke et al. .............. 340/870.02
6,633,825 B2 * 10/2003 Burns et al. .................... 702/61

(Continued)

FOREIGN PATENT DOCUMENTS

| DE | 199 30 263 A1 | 12/2000 |
|---|---|---|
| DE | 100 24 544 A1 | 11/2001 |

(Continued)

*Primary Examiner* — John Breene
*Assistant Examiner* — Stephanie Bloss
(74) *Attorney, Agent, or Firm* — Rankin, Hill & Clark LLP

(57) ABSTRACT

A measurement device, which communicates data to at least one system, and which has the capability of identifying measurement data returned by the system via the data communication as its own, and the capability to rule out manipulation of measurement values without use of a public or non-personal key. The measurement device includes at least an encryption and/or signature encoder that supplies information including a validity and reliability identifier for inspecting the integrity of the data, and compiles said information into a current data set and transfers it to at least said communication interface for transfer, and at least an encryption and/or signature decoder that inspects data sets returned via the communication interface using one or more keys in memory for integrity of data content and identification of the measurement device and, upon successful inspection of this data, supplies said data for further processing, evaluating or displaying.

11 Claims, 5 Drawing Sheets

Figure 1:
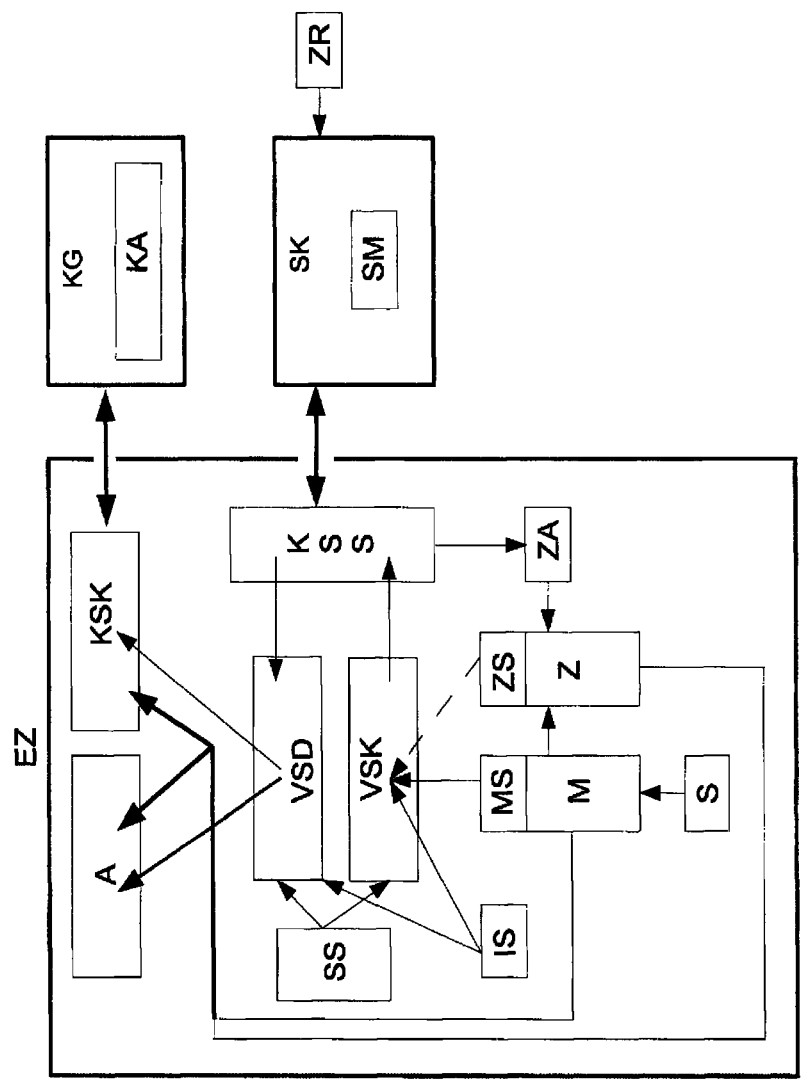

(52) U.S. Cl.
CPC ............ *Y04S 20/322* (2013.01); *H04L 2209/60* (2013.01); *H04L 2209/805* (2013.01); *Y02B 90/245* (2013.01); *Y04S 20/36* (2013.01); *Y04S 20/40* (2013.01)
USPC .................................. 702/85; 702/61; 705/63

(56) References Cited

U.S. PATENT DOCUMENTS

| | | | |
|---|---|---|---|
| 6,893,395 | B1 | 5/2005 | Kraus et al. |
| 7,053,790 | B2 * | 5/2006 | Jang et al. ................ 340/870.02 |
| 2006/0195697 | A1 * | 8/2006 | Akiyama et al. .............. 713/178 |
| 2006/0206433 | A1 * | 9/2006 | Scoggins ........................ 705/63 |
| 2006/0271244 | A1 | 11/2006 | Cumming et al. |
| 2008/0155066 | A1 * | 6/2008 | Danz et al. ..................... 709/220 |

FOREIGN PATENT DOCUMENTS

| | | |
|---|---|---|
| DE | 100 34 274 A1 | 1/2002 |
| DE | 102 040 065 A1 | 8/2003 |
| DE | 600 01 358 T2 | 6/2004 |
| DE | 10 2005 033 162 A1 | 9/2006 |
| DE | 10 2006 030 533 A1 | 1/2008 |
| EP | 1 677 270 A1 | 7/2006 |
| EP | 1 850 500 A1 | 4/2007 |
| WO | 2004021020 A1 | 3/2004 |
| WO | 2006/048143 A1 | 5/2006 |
| WO | 2008/086231 A2 | 7/2008 |

* cited by examiner

MEASUREMENT DEVICE, PARTICULARLY ENERGY COUNTER AND METHOD FOR RECOGNITION OF MANIPULATIONS

The invention relates in accordance with claim 1 to a measurement device, in particular energy counter for the safe detection and displaying of the count data and in accordance with claim 6 to a method for recognition of manipulations.

Nowadays consumption data is recorded on various utility supplies in a household (electric energy, cold water, hot water, air-conditioning, gas, fuel, arid other materials of the kind), the meters being located in various measurement points. In all their applications all these utility services, which are collectively called Multi Utility, share the following characteristics:

- The need that values that are taken and checked (calibrated) and shown in the invoice should be beyond doubt (in a word, consumer protection);
- Values taken locally should be digitized and transferred to a central office to be processed;
- The implementation of a fast, timely and customer oriented book-keeping should be conducted as well as Cash Management control; and,
- The need to create an uniform solution for all kinds of supplying.

Prior technical development of measurement devices and systems for taking combined seizing/reading of consumption data have certain typical weakness and problems such as lack of general validity or single solutions in regard to certain segments. Usually, utility companies like power supply companies or water supply companies prepare consumption reports based on data based on data of clients' counting devices, which most often are installed close to the consumption point. The measurement devices may be for gas, water, electricity, heating, etc., and data provided by them covers previous periods, showing consumption in the relevant consumption point. In principle, data reporting of the counter, and, respectively, data reading is made at least once a year for every house, apartment or a consumption point.

According to U.S. Pat. No. 6,538,577 B1, an electronic counter (consumption data counter with two different types of communication between the measurement device and the utility (consumption data processing main office) is known. Communication with this main office is made indirectly via a two-way wireless receiver through a local network (with two-way range of 900 MHz) to the gateway, which is connected to the main office via two-way WAN. The direct method offers a network interface (PLC module→communication network module) attached to the back of the counter plate. In that case the LAN and/or the gateway are bridged (bypassed, as therefor are not necessary). The measurement device features a module design, which allows one to remove and replace panels and modules inside the counting devices, them being laid on a universal plate or slot and are used to transmit data and assure quality of electricity. The gateway is placed far from the counter and has four components; namely, WAN interface module, initiating-microcontroller, a spread-spectrum processor and RF-transceiver. The radio transceiver is able to transfer data to the main office. According to U.S. Pat. No. 6,538,577 B1, data exchange between the measurement device and the gateway takes place only in (LAN-) radio operation.

A further method for set up of an AMR-network is described in EP 1 677 270 A1, comprising the following components:
- Counter
- Gathering Units (for example, an electric meter or Terminal Units);
- concentrators (usually, industrial mainframes), where for the three types of connections, the following is envisaged:
- LPRB (low power radio or Bluetooth);
- PLC (power line communication);
- MC (mobile connection, mostly for mobile phones)

for creating optimal connection in the AMR networks. Besides, a conversion between LPRB (at the input) and PLC (at the output) takes place in at least one gathering unit.

In addition, from WO 2008/086231 A2 a mobile consumption data reporting system and a method for radio-reading of consumer counting devices during a tour for data reporting and re-configuration of the data taking by the AMR-consumption data collecting system are known. Measurement devices can be devices for measurement of gas, water, electricity, heating, an electronic exchange, etc, which meet in an end point through a radio interface. Furthermore, the data reading staff can in a tour take the readings with a mobile data receiving device, which grasps by means of a radio signal the readings of all counting devices within its range. When using the so-called drive-by unit, the mobile receiver-transmitter device moves slowly with a car along the street where houses with transmitting counters are located and whose data should be taken. This mobile receiver-transmitter device is intended to send data readings taken from the counter by the radio-receiver device to the main office for reporting using the counting device's ID. The data sent is transferred via a mobile radio-system (uni- or bidirectional radio link) to the main office for reporting within a certain period, starting from the moment of taking the data off the counter with the mobile device. In addition, information on the location of the measurement device can be taken, i.e. through a GPS functionality, and this information is to be sent from the reading location to the endmost mobile device of the person collecting data via the mobile system. The main office is automatically registering cases where a counter is omitted by mistake, or when a counter is not transmitting a signal due to a technical defect or interference, or readings are not taken correctly because the main office has not received the expected identity data from such a counter. Integrity and validity of the data taken will be checked through CRC-codes, while the accuracy check of data that have been collected will be conducted via the measurement device through a "feedback" in the form of message "report". Such being the case, the main office will be able to automatically deliver a feedback message on the measurement device that has not been reported to the mobile system of the person taking the readings. This person can then take the reading once again, within the required radio-range of the measurement device omitted, and through an eventual search for more suitable locations for signal receiving to get new information on data (data from the counter, identity data of the counter, location data) from this particular measurement device.

For the centralized data taking and remote taking of measurements to be realized, i.e. to harmonize servicing of all quantities consumed against economic conditions, as well as to succeed in the management of energy on the basis of values/history measured, from EP 1 850 500 A1 in the name of the present applicant a data taking and management system is known, which shows:
- At least one radio-module connected through an antenna—for connecting at least one remote module of a device or a counter equipped with a radio transmitter and/or receiver;
- A control device, connected to the radio-module, comprising a program and data memory for temporarily store the data sent by the radio-module;

A communications module, connected to said control device and the relevant connecting module for transferring the data sent via live wires, and A communication gateway, connected to the electricity supply lines through a communications module and a second connecting module, said gateway is disposed where the counter is located such that the communication gateway together with the electricity supply lines within a household, forms a backbone network for data transfer, and carry out exchange of such data between the remote module or the counter and the communication gateway in combined radio-/powerline-mode of operation.

The data transmission method in a system for collecting and managing data according to EP 1 850 500 A1, is characterized in that:

the radio-module serves to connect the remote module or counter;

the communications gateway has a node function and transfers data from/to a central measurement or transmission spot;

the communications gateway, together with the electricity supply lines within the household, are forming a backbone network, intended to transfer data;

the data exchange between the remote modules or counters and the communications portal is performed in combined radio/powerline-mode of operation;

the communications portal forms an interface for other value added services in the field of Multi Utility, safety equipment, home and buildings management, as well as for services in the field of home automation, including energy management.

Electric meters featuring two or more counters to calculate different rates, whose counters are reset through built-in or external remote control receivers (that are controlled via a central remote control equipment on the premises of energy suppliers) or are switched over through automatic timers, respectively, are utilized for long periods of time. The electronic electric meters developed in the past few years do not contain mechanical elements. For example, energy consumption is measured through a current transformer with a soft-magnetic ring core (respectively, a measurement system with Rogowski coil) with the help of a shunt resistor (Shunt) or a hall element. Energy metering is made through an electronic device, while the result is reported on an alpha-numerical display (most often a liquid crystal display, LCD). Some special (industrial) clients use a different type of counters, as they measure power. In reality, however, counters here are gradually being replaced by electronic ones, with an option to report transmission load. In this way, the rate setting can be changed without contacting the counter; therefore, there is no more need for separate/individual counters in the electric meters.

Readings of some electronic electric meters can be taken remotely from the energy and automation suppliers through the interface. In practice, the interface used represents: an infrared port, S0-interface, M-Bus, potential-free contact e.g. connected to GSM, PSTN modems or PLC modules. At present (April, 2006), in Germany field tests are conducted via an uninterrupted internet connection (DSL). In the United States, electronic electric meters for households are being developed with built-in relays, which, for example, allow them to cut electricity off until the electricity bill is paid, in addition to remote readings taking. In Germany, in the frame from pilot projects intelligent counters become increased usage to introduce Smart Metering technology. Usually, impulse-outputs (S0) are sending consumption-related signals, between 2000 to 5000 impulses per kW/h. Afterwards, depending on the counter, this value should be multiplied by a certain coefficient, for example, 30 or 50, to get the cumulative value.

Furthermore, cash counters (coin counters) exist, which allow customers to obtain a certain amount of electricity by depositing money, tokens or with pre-paid cards as well as via the installation of chip-cards, chip-keys or through a PIN code. In Germany, such counters are used in individual laundries, or by energy suppliers whose clients nurture a poor pay policy.

Energy consumption of corporate consumers is calculated based not only on energy used (kW/h), but also on average power consumed (KW). In this case, multi-rate electric meters are used that take readings and record average power consumption once every 15 minutes (¼ hour power measuring). Usually, the readings of these electric meters are taken remotely. Loading is calculated with a standard electric meter for smaller customers (for example, H0 for individual clients).

In Germany, electric meters used in trade are subject to calibration duty. Once the calibration term of validity expires (in 16 years, 8 years for electronic electric meters, in 12 years for mechanical induction electric meters i.e. with a rotor disk, respectively), the measurement device should be changed or the calibration term had to be extended.

For communication (primary measuring data exchange, in addition, firmware-upgrades) the Smart Message Language SML, which is similar to the XML programming language (an industry standard) is used (mostly for data exchange but also for firmware update) in field tests since 2008, in a total of 2000 synchronous multi-rate electric meters, distributed among several companies. The SML language is also undergoing tests. This should replace the existing specific commands for taking readings off the counters. Conventional multi-rate electric meters feature a real time built-in clock, which restarts in a pre-set time following electricity stoppage. If multiple errors of this kind occur during the two reading takings, the particular reporting period is not available anymore and the different counters show conflicting times, then the values taken are not valid.

There are different approaches to solving the problem. Some multi-rate electric meters use a real time clock and apply a synchronization method, under which watches are adjusted on a regular basis. A synchronous multi-rate electric meters specification requires installation of a second meter instead of a real-time clock. This counter's position increases by the second in a strictly monotonous way and clearly identifies the state. This second's index is connected to the absolute time after taking the reading of the synchronous electric meter. The sequence of values taken remains clear even when time and again these counters experience power shortages. Differentiation between a base device and various modules is observed in the synchronous electric meters, while all basic devices and modules of all manufacturers should be compatible with each other. The basic device provides only the basic functions as compulsory components included in a particular counter. All other functions like an interface for connecting to other devices or communication units (e.g. GSM or GPRS module) can be applied as modules. Thus, the need to develop a new device for every application is dropped, and, respectively, the need to buy such a device is dropped as well. On the other hand, it grows increasingly important to secure protection against manipulations of consumption reports based on electric meter data. The focus here is on manipulations, in particular, on the opening of sealed bodies of electric meters by customers.

For example, WO 2006/048143 A1 a device is known which is able in a reliable and energy-saving way to detect manipulations on the housing of household electric meters without using mechanically triggered buttons or magnetic and photoelectric switches. In particular, this device envelops a part of the body where the electronic receiver is placed, as well as a second, separate from the first, part of the body, with the first part being secured against illegal removal of the second part. An electrical resonant circuit is envisaged in the first part of the body, and this circuit is made of spool and a capacitor, while the spool emits signal through the metal element placed in the second part of the body when the distance between the spool and the metal element changes. This signal is directed to the electronic plate in the first part of the body and assists further processing. In order to find that the second part of the body is parted from the first one, which determines the change of quality of the spool within the resonant circuit, absorption power of the oscillation of the resonant circuit decreases along with the continuation of the electric switch's reverse pulse. Preferably, the device's electric resonant circuit is mounted close to a low energy consuming circuit-breaker. A very short low energy pulse is enough to feed this circuit. If the excitation occurs concurrently at a relatively low frequency, e.g. once every 10 seconds, a low average power of the control circuit is achieved, allowing a device featuring primary or secondary batteries or high capacity capacitors to run for a very long period. The continuation of the reverse impulse is directly related to the absorption power of the oscillations of the resonant circuit and is calculated using a microprocessor circuit.

Such a protection against unauthorized manipulation is known from WO 2004/021020 A1. It applies to a counter body with a sealed lid that covers counter terminals, where at least one of the additional devices is covered, i.e. is secured against unauthorized access through a second seal. The seal of the additional device is designed in a manner that is freely accessible when there are no terminals, enabling easy and fast inspection. Therefore, the body of the electric meter is equipped with at least one hoop on the seal, connecting the hole for the seal to the additional cover, with the seal's locking-finger functioning as a connecting element of at least one hoop and one hole. It is very advantageous when at least one hoop is placed at a distance from the hole for the seal, so that the breaking point of the locking-finger is visible, especially in the case of transparent locking-fingers.

Electronic electric meters, which, in principle, possess electronic circuits for measuring, calculating and showing energy consumption information, can cause problems during electricity blackouts or other cut offs of the power supply in the form of alternating current. In order to solve these problems, methods are developed to register critical data in an energy-independent memory if an alternating current shortage occurs, e.g. energy-independent re-programmed memory with electric record and electric deletion (EEPROM). Some counting devices include battery cells that allow working parts of the digital circuit to be relieved during electricity shortages, allowing the clock cycles and other switches to continue functioning. In order to take the reading of the electric meter during a cut off of external AC power supply to the counter, an electronic counter is known from DE 600 01 358 T2, which is activated through an indicating signal by an operator (e.g. by pressing a button), which acts as a feedback to the signal for information reading from the electric meter for a limited period of time. More specifically, this electronic counter contains a measurement circuit with a circuitry for energy consumption, which gets analog signals from a sensor switch (transformers, resistors, built-in serpentines or other similar units) and submits unprocessed data on energy consumption and other data, as well as a processor, energy-independent memory and a display. Moreover, a measurement circuit contains circuitry for supply of preliminary electricity for the abovementioned components, including electricity supply, a switch intended to find electricity shortage, primary and additional reserve supply. The electricity for the display unit during electricity shortages is also supplied by a reserve supply, while the electric current is with a lower voltage because the display is activated only following a signal from the operator; therefore, the showing of the electric meter's information lasts for a limited period of time. The first selected amount of information can be displayed during average working process, while a second selected amount of information can be showed in a case of power failure. These amounts of information can be different or identical. A user can program the elements of the information received, which form the first or the second selected amount of information. The aforementioned arrangement for delivery of electronic reading of consumption information during power failures can also be easily installed in other household electronic counters, including gas meters, water-meters or their like measurement devices designed for utilities.

Another issue is related to the liberalization of the energy market, which allows end users to select their preferred electricity suppliers. In order to allow remote taking of readings and mainly to automatically process the various amounts used, we familiarize with an instruction provided in DE 100 24 544 A1 in which the reading taking device is connected to the measurement device, which in this way gets the relevant consumption data on amounts consumed and gives them an absolute time value from where the transferred data originates, while it reciprocally shows data on the period and consumption during that period. The data reporting device is a long-distance communication network (e.g. data transfer via ISDN, Internet connection, analog telephone connection, radio-network and other similar transfer methods) for transferring data at a longer distance toward the stream. The long-distance communication network is connected with the data processing device to get and compute the data transferred, and which summarizes consumption data depending on the period. The device has memory, which collects and stores the data transferred and delivers data to the device for summarizing the data. Transfer of data collected can occur in a particular moment, can be related to particular events, or can be initiated by the data processing device or by the data summarizing device (e.g. if a particular amount of data is present in the summarizing device). Furthermore, identity data is transferred along with the data transmitted, as well as such which help the data summarizing device identify the measurement device. The data summarizing device is not functioning if a power failure occurs. Memorized data is stored. Power failure's duration is recorded minute by minute and can be verified any time. For example, following a power failure, the data summarizing device demands an actual date and hour and sends a message that a power failure occurred to the data processing device. Zeroes are recorded in the inner cells for the data memorized since the very beginning of the power failure. Thus, one can check the duration of the power failure at any later moment. Mostly TCP/IP protocols (Transmission Control Protocol/Internet Protocol) or PPP protocols (PPP=Point-to-Point Protocol) are used as interface protocol in this case.

Another issue arising from the energy market liberalization is the often unencrypted transfer of confidential and personal data, which stands the risk of allowing unauthorized persons to easily get access to such data and use it in ill faith. According to DE 10 2006 030 533 A1 a method for transmitting and further processing of information from customers' measurement devices is known. In this method, various information on the measurement device emerges (date, hour, device's number, actual location, technical status, validity, information on mis-manipulations, connection conditions, temperature, and others) which is collected by the device itself while becoming available in the form of digital information. During the second phase, this information is received by a processing module and is summarized in a mathematical algorithm coded in a general letter-numeric report on the status. The processing module consists of a microprocessor with a programming unit, containing the coding program and the memory. The encoded status report is entered into a permanent memory and can be made available in various forms for different orders or processing, respectively. The encoded and self-controlled status report can be displayed on the measurement device through activation of a button on the LCD display, for example; and can be transferred through an infrared connection or electronic interface (e.g. Internet-transfer, radio-connection, via telephone/cable Internet connection, GSM, GPRS, UMTS and others), or through a facsimile or another communication-led connection (PLC). Various essential and mobile data of the relevant measurement devices is decoded through a complex information system for management, using consumption data deciphering processes, resulting in a planned use and processing.

Electronic signatures, and increasingly digital signatures, are used as electronic identity validation in processing data and more often digital signatures (this is a cryptographic method in which a digit is added to a particular "message", and this digit's authorship and affiliation with the message can be verified by everyone). Digital signatures are based on asymmetric cryptographic systems, using a unique pair of keys, made up of private (personal) and public (non-personal) key. In the German legislation on signatures, these keys are called a (private) secret key and (public) test key. Their names in English are, respectively, a Private Key and a Public Key. The private key is not tied directly to the message in a digital signature but to its Hash-value that is computed through the Hash-function (e.g. SHA-1) by the message. Since the public key is published through the electronic certificate of a particular person and because there is only one private key that corresponds to a public key, one could find and verify, through the public list of those who offer such certification, the certification location which, in turn, can be verified at a higher instance. A device featuring a digital signature with a time stamp is known as a time-stamp device. One should bear in mind that it is important to differentiate between the local time of a time-stamp device and a standard time within a preliminarily set value threshold in order to provide a time stamp for the digital signature. The local time of a time-stamp device can be managed through radio-waves in a way that sets an incorrect standard time so that the correct and actual time seems to be running ahead or behind against this time. To avoid local time manipulation by a not authorized from DE 10 2005 033 162 A1 a time-stamp device with an energy supply mechanism is known. This energy supply mechanism reduces electricity consumption not only during idle periods of the module, but also after a time-stamp device is started for the first time after an idle period (a "standby" module). Besides, an internal clock cycle carrier should not always be in a standby position to always get the time-set signals. Through a forecast of the authentic key, this should result in taking a standard time by a time-server with a preset time. Direct memory (RAM) should be located more remotely to memorize the authentic key, mostly when unstable memory is utilized while electricity should always be supplied to the RAM to prevent unauthorized users from getting access to this key's authenticity. Electricity is supplied only to the RAM during phases when the module is not transmitting. Electricity is supplied to all functional units of the time-stamp device during transmission. Thus, the authentic time captured by the unit deciphers the locked authentic time through the authentic key that is remembered in the memorized unit. A time-modifying processor, corresponding to the performance type, modifies local time through time radio-waves, while a time-correcting processor gets the authentic time from a time-server, during predetermined conditions, in order to correct the local time. During the module's "standby" regime, energy supply to the customers can be cut off through an energy supply controller for signal time settings and through the units of the indicators. Should an unauthorized user try to dismantle the time-stamp device to get the authentic key, electricity supply to the memory /RAM/ will be cut off and the memorized authentic key will be deleted.

Furthermore from DE 102 04 065 A1 a method and a device for authentication and integrity safety of the consumption values measured is known. Transfer of ready data and/or control code and/or identification code via the public network follows, e.g. through the power grid and/or Internet network and/or telephone network and/or GSM-network and/or UMTS-network. Data summarized through an individual marked instrument for data summarizing is consumption values measured for electricity, gas, and water. It is advantageous, it appears, that the control code memorizes a specific number of data in the summarizing instrument and this data can be seen while the identification control code, which verifies an individual marked instrument that covers data, plays an important oversight function. The way this method is implemented envisages control over the integrity of transferred data, as well as automatic refreshing of the control code. The new code is generated in the same way as the one preceding the data transfer, and the newly created code can be compared to the transferred one and/or the control code that is memorized in the individual marked instrument before the transfer. Sometimes, the instruction covers data reading devices, a random numbers generator, a means to capture managed signals for activation/deactivation of random number generators, a means to connect decoded data to the numbers generated by the random numbers generator, a means to compute control codes from deciphered data or related ones with random numbers or instruments for control code transmission. Moreover, this instruction covers at least one securing element, preventing or showing unauthorized instruction interventions, and means for re-transmitting data in the form of a display, means for storing data and/or entering orders for data memory access and/or for selecting data, which are to be transferred once again. It appears that the counter stores the values measured or affiliated with them control code of the measurement device, following the assessment and according to the method and instruction for authenticity and integrity of values measured according to DE 102 04 065 A1. The measurement device's display shows only what is memorized in the device.

Finally, from DE 199 30 263 A1, a method and device for data transfer between an electric medical implant and an external device for monitoring the condition of the patient in question is known. Such electric medical implants are, for example, a cardiac bypass, defibrillators, cardioverters or other electronically functioning and manageable implants, respectively. For the implant to function in an energy efficient way, an off signal is always initially sent by an initially implanted sending/receiving bloc, i.e. the sending block/implant's receiver, where the receiving readiness of the first sending block/receiver is preserved for a second period after the dispatch of the off signal. The receiving readiness of the first transmitter/receiver is maintained during a particular period, which is shorter than the period until the next signal; therefore, at least the receiving unit, and most often the transmitting unit of the first sending block/receiver as well, will switch off before the next signal, thus, ensuring energy savings. The aim is to achieve vast energy savings depending on how correlation between the receiving and quiet phases is changing. Furthermore, the external device is planned to conduct initial control over data transferred from the first sender/receiver bloc. In addition, particular control BITS of data sent can be tested, according to certain criteria. The first report regarding the verisimilitude of transferred data contains secondary information for management of the first sender/receiver bloc. The secondary information contains a signal for deleting data that is sent over again through the first sender/receiver block if verisimilitude is breached. The aim of this procedure is to give priority to achieving higher security of the transfer because most probably the incorrect data transferred will be requested once again. Further increase of data correctness probability is targeted as the second sender/receiver block, controlling the transfer, sends back at least part of the data transferred to the first sender/receiver block if verisimilitude of the data transferred exists. It is very likely that a fault occurred yet during data transfer to the second sender/receiver bloc if the data do not correspond to the data transmitted. In the first place, the implant sends a second report to the second sender/receiver bloc following the test of the data transfer through the first sender/receiver bloc. If successful data transfer is confirmed, this report contains an initial signature of the transfer validity. The implant coordinates at least the receiving readiness of the first sender/receiver bloc with regard to this, while sending readiness is a priority. Renewed off signal transmission marks the progress of the quiet phase, which in this case is optimized against its duration. Furthermore, the external device performs a second check with a second counter aiming to increase data correctness probability. A new request to the implant is sent after a certain period following the sending of the second report if breach of verisimilitude is found in the second report. Then, following the expiry of the next time period, the implant accepts the sending/receiving readiness of the first sender/receiver bloc for the purposes of a new time period, and this is a sufficient condition for requesting to the external device to be initiated and to get response. The response to this request is made through a newly dispatched second report and/or the last sent data. Thus, one finds that short passing faults would have limited impact. Furthermore, comparing the second report sent to the external device and/or the last sent data, one decides whether data can be accepted as correct. If incorrectly transferred data is found, a new transfer follows through the first sender/receiver bloc, provided that the number of renewed transfers is not exceeded, aiming to avoid overloading implant's energy supply. For transfer through CMC, 128 Bit DES locking method is applied based on the system of private-public key. The locking is conducted using software, i.e. no IC-locking is applied. In this special technical sphere of medical equipment, there is no need to additionally encode the implant's specific data encoding on the route from the implant to the external device due to the short range.

There are different systems for deciphering counter's data depending on the state of the equipment, and they are collectively called AMM-system (AMM: Automatic Meter Management). The term AMM replaces the well known term AMR (Automatic Meter Reading) (in German it is known as ZFA (Remote reading taking of the counter) because new characteristics are added to the initially observed basic functionality for data deciphering. The main aim of development, however, is end-user/client protection from manipulations, and, respectively, clearly automatic transfer without interruptions and errors in consumption values, and their allocation to the relevant counters, for the consumption invoices to be prepared in the computing centers of the relevant utility suppliers based on these values. As a rule, devices of energy suppliers are configured in a manner that provides the easiest and economically most advantageous (a resource counter, e.g. an electric meter and water-meter) way of taking consumption data on the spot (i.e. at the end-user but also in industrial premises and communes) while being easily and advantageously transferred to the main office (through communication), which is to process them into automated invoices in favor of the abovementioned client. The energy supplying company, which serves the resource counters, install them and takes the reading to the client is always the user; the same applies to communication devices. Data from consumption counters should always be transferred to the main office for calculation, according to the relevant equipment, and eventual faults, e.g. leaks to be registered accordingly. Little attention is paid to personal ring of end users, e.g. dwelling places. Therefore, there is actually no method to detect manipulations made, which are to be applied regardless of other technical datum and which are to allow the client to apply self-control on the spot (use, leaks, and others). This is of particular importance to the measurement devices in the manufacturing industry, which is viewed as a progressing industry enjoying favorable development, where improvements and facilitation are accepted and applied in practice rapidly.

It is, therefore, an object of the present invention to design a measurement device featuring data communication to at least one system in such a way that allows the system to identify the measurement data sent back as its own data, including a data manipulation check.

In accordance with claim 1, this problem is solved by a measurement device, which communicates data to at least one system, which has the capability of identifying measurement data returned by the system via the data communication as its own, and to rule out manipulation of measurement values and to thus provide this returned measurement data reliably for further processing/evaluation or displaying, which comprises:

at least a communication interface to components of a system, which at least has the capability of receiving signed and or encrypted measurement data, storing said measurement data in a memory and delivering back, and has the capability of offering time information related to a time reference, at least a measuring module, which assigns measurement signals to energy measured values or counts supplied by at least one sensor, at least a memory for the last determined energy measured value or count (short named: measurement value), at least a memory for a time stamp, which in the time module was determined for the last generated measurement value, at least a time adjustment module, which checks and adjusts the time, offered by said communication interface of the system, to the local time of the time module, at least a memory for the identification assigned to said measurement device, at least a memory for one or more of the keys required for encrypting and/or signing, at least an encryption and/or signature encoder that supplies, using the key in said key memory, the information offered to the aforementioned memories, including the validity and reliability identifier having information for inspecting the integrity of the data, compiles said information into a current data set and transfers it to at least said communication interface for transfer, wherein only one part of the last data sets or their content is saved in the measurement device, and at least an encryption and/or signature decoder that can inspect the data sets returned via the communication interface using the key in said key memory for integrity of the data content and the identification of the measurement device and upon successful inspection of this data supplying said data for further processing or evaluating or displaying.

Further, according to claim 6, this problem is solved by a method for the recognition of manipulations with a measurement device, which was approved and/or a calibration was legally tested, with the following method steps:

generating data packets, those containing at least an identification, a time value, a measurement value and a signature, hands over these data packets to a system or components of the system, which was not allowed and/or said calibration was not legally tested, said system or components storing and delivering back these data packets or relevant parts on request of the measurement value, storing of data packets or their content which in the meantime were not stored in the measurement device, validating with proven safety by the measurement device of data packets or their relevant content, supplied by said system or components of said system, on the basis of a key and a signature if said data of the data packet did not modified and coming from said measurement device and displaying these successful tested data on a display, which was approved or the calibration was legally tested, with the same confidence status as measurement values, which did not leave said measurement device.

According to the invention and the state of the equipment, the measurement device demonstrates the advantages of the simplified processes and lower costs because the data can be memorized in an untested device or system, e.g. a measured database with the measurement values of the network operator in a single computing center. Another advantage is that the value pairs, for example the counter and time stamp, can be applied in the set rate forming; therefore, the relevant value pairs can be issued along with the invoice. Accuracy of value pairs can be checked directly by the client by means of basic resources, e.g. tester to a counter for review/look through the measurement values, with the client not being forced to look for actual data within a long list of all values taken by the operator. Measurement devices create numerous measurement data (e.g. counter profile featuring values once every 15 minutes) that is transferred to a modular system. The preset rate forming, regardless of the contract signed with the client, decides on which values are applicable to the calculation and which are to be issued along with the invoice (printed on paper). It is far more convenient to use only the values from the counter to check the calculated values; moreover, the process is eased significantly if 2 to 4 correlating values, from 96 values a day, are extracted. This is easy to materialize because the modular system is able to send back and transfer only the computational values used on request by the client (for example, through a button on the counter or communications module). The counter is able to safely determine, through the available signature, that it is showing only non-manipulated values on its display, despite that all these values are not stored in the measurement device. Thus, the measurement devices could be much simpler because they do not require memory to store the values taken and control codes. Furthermore, it is advantageous that the client have trust in the counter, because PTB or a similar organization has verified that only valid and correct data has been showed (originating from the tested part of the measurement device/counter).

In a preferred embodiment, according to claim 2, said measurement device has a customer interface, which hands over data sets checked on integrity of the data content and the identification to any suitable apparatus of the customer, which has own display or serves for the passing to an apparatus with display.

Such a configuration of the device has the advantage that the PTB-tested client interface, available in the counter and the Physics-technical Federal Office, is able to directly decode and process the data checked through devices of client's choice (e.g. reading head with USB-interface/Universal Serial Bus and commercial computer software).

In respect to a preferred embodiment, according to claim 5, the device uses as a time reference the UTC time, time coordinated by the universities, especially UTC(PTB) by the Federal Physics and Technology Office (Germany).

Other advantages and details can be seen in the below description of preferred embodiments of the invention and the accompanying drawings. The drawings show:

FIG. 1: A functional block diagram of a measurement device, configured as an electric meter.

Figure 2:
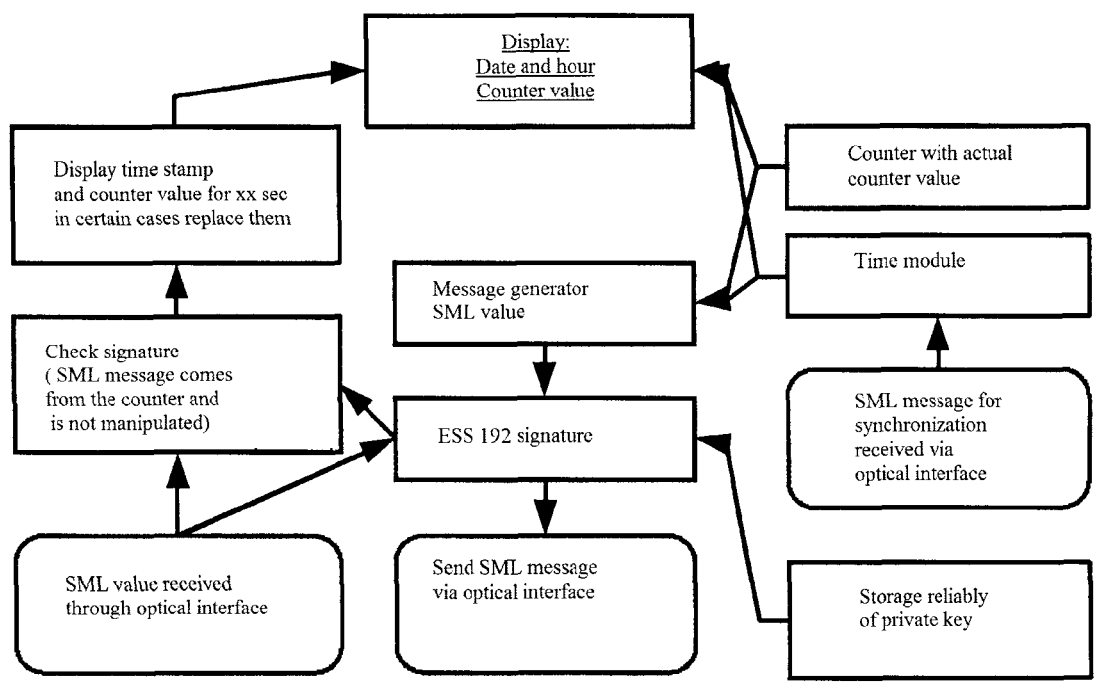

FIG. 2: A flow chart for an embodiment of an electric meter, according to FIG. 1, realized without a push button and using two optical interfaces.

Figure 3:
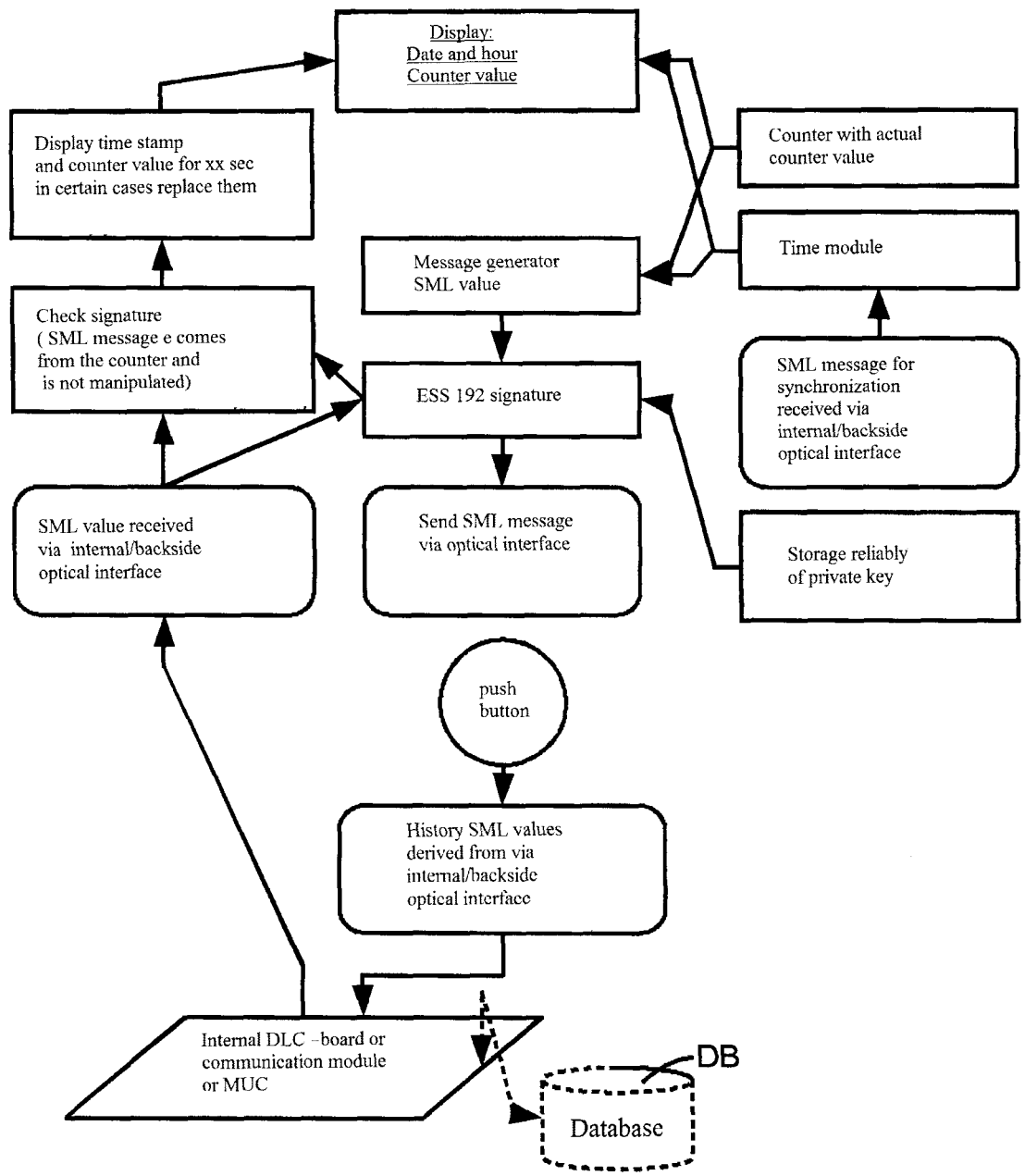

FIG. 3: A flow chart for an embodiment of an electric meter, according to FIG. 1, realized with a push button and using an optical interface of the communication's module.

Figure 4:
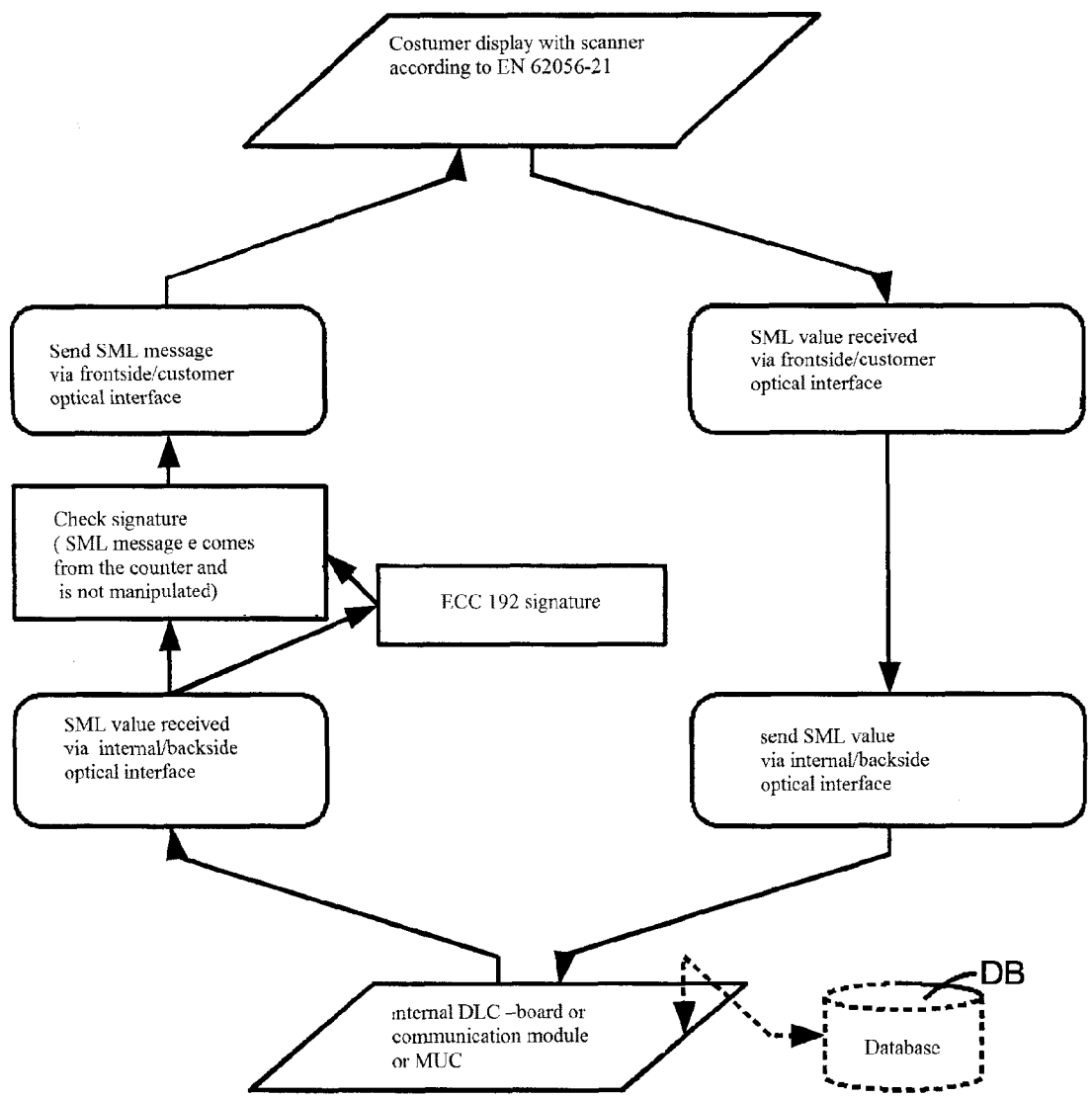

FIG. 4: A flow chart for an embodiment of an electric meter, according to FIG. 1, with verified data transfer to the client's interface or to the display.

Figure 5:
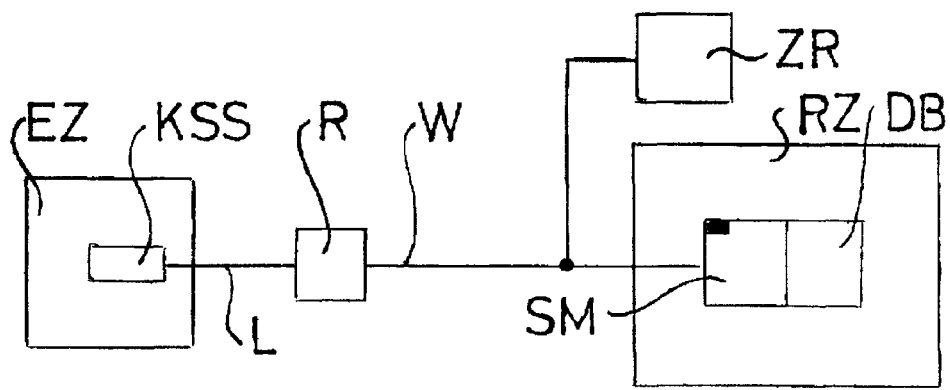
Figure 5:
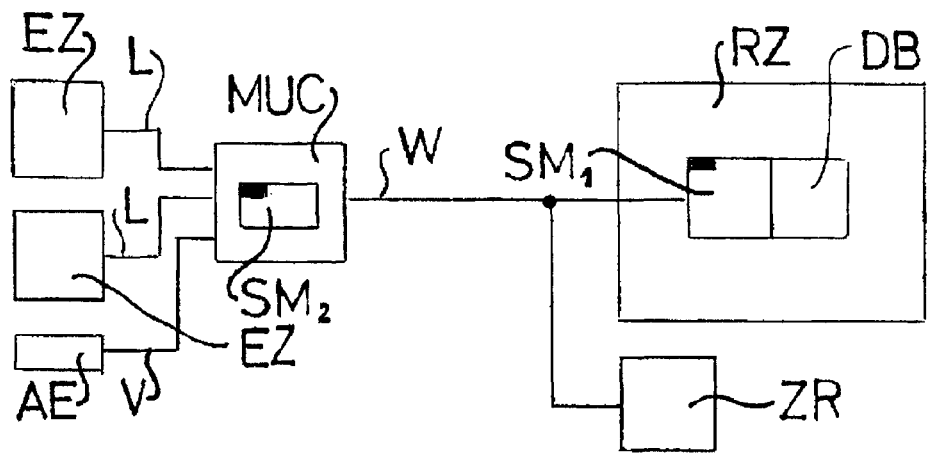
Figure 5:
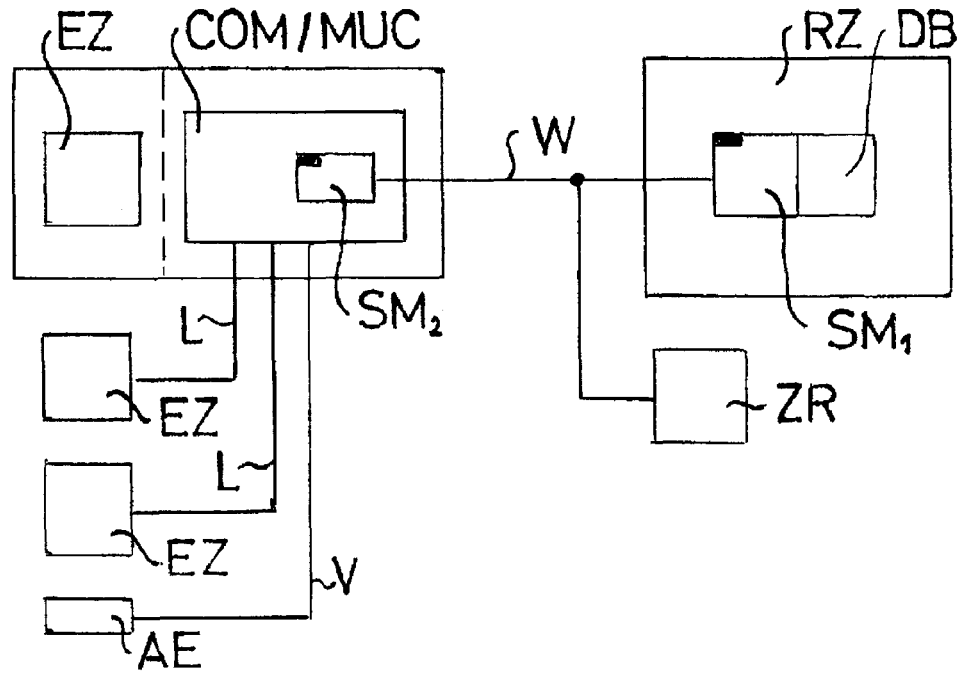

FIG. 5: Various embodiments of the electric meter's connection, according to the invention.

FIG. 1 shows the functional block diagram of a preferred embodiment of a measurement device—an electric meter, which is easy-to-use by a customer with no EDV knowledge. If subsequently the solution is configured to work as an electric meter, it would be possible to start using the measurement device/electric meter and the respective methods of other devices with the respective interface, for example, for measurement of energy savings at solar facilities connected to the power grid. This should result in a situation where the concept, on the base of configurability, is to allow a uniform, device-independent error processing while enabling easy adaptability to the respective datum and connection without the need to make changes in the device. Apart from the main functionality for taking counter readings, the system also affects the outgoing communication. This communication can be connected to different types of interfaces, mostly a KSS data-decoding interface, for example, remote data taking, which are mainly used to calculate the energy from EVU, while the other KSK client interface is intended for consumption control and verification of invoices from the EVU. Different implementations are possible for the interface within the device, e.g. the following communications for an interface to EVU: PLC, GPRS, or a combination of more communication technologies. KSK client interface can be implemented through a display or computer monitor or data to be delivered to client's device (KG) via another communication technology like USB, for example.

FIG. 1 shows an electric meter EZ featuring data communication to at least one system, while the system is allowed to identify the data that is sent back as its own through data sharing, which at the same time permits no data manipulation; therefore, the returned measurement data are to be displayed correctly as Indicator A.

In this case, the electric meter EZ shows at least one KSS communication interface to the KS components of a system, which is able to get the signed or locked measurement values, to store them in a SM-memory and submit them back, concurrently providing information on the time with respect to time reference ZR.

The time reference ZR can be related mostly to PTB NTP-server in Braunschweig. The measurement device/electric meter is built of two main groups, namely, a measurement M-module and a sensor S-module. The measurement M-module arranges measurement signals delivered by the sensor S-module, energy values or such values for the counter. In addition, the following types of memory are envisaged: a minimum of one memory (MS) for the last submitted energy values or those of the counter (in short, measured values); a minimum of one memory (ZS) for the time stamp, in the time module Z, for the last emerged values; a minimum of one time adaptive module (ZA), which verifies the time reference (ZR) provided by the system via the communication interface and enters the local time into the time module Z; a minimum of one IS-memory for identifying the measurement device; a minimum of one memory (SS) for locking with a key or signature. Besides, a serial number or a system property number is stored in the identification memory IS. In addition, the electric meter shows at least one memory that is connected to an encrypting encoder and/or signatures (VSK), using the keys in the key memory SS, which envisages storing into the identifications IS-memory, the memory for measurement values and those of the MS-counter, and time stamp's ZS-memory of information provided, including information from the validity and reliability identifier, in an actual packet along with the information on the integrity check and transfers it to at least one KSS-communication interface. Different validity and accuracy signs can be summarized through a single status definition. Previous data or its contents will not be stored in the measurement device (e.g. older than the last five). At least one decoder for encrypting and/or signatures is envisaged, which decodes the data set with values on the contents' integrity that is submitted via the communication interface through entering a key into the algorithm memory, and verifies measurement device's identity. The data is submitted for further processing, assessment or presentation if the verification is successful.

A minimum of one management device with program memory (not depicted on the scheme) is envisaged for managing the issue on the monitor A, assessment of the management signals and primarily for triggering of a tester /not depicted on the scheme/, or memorizing of the synchronized local time, for increase or decease of the actual cyclic time, etc.

The measurement device/electric meter displays user interface KSK and submits through it verified for integrity and identified data sets to an unidentified client's device KG, which has a KA-monitor or transfers the information to another device that possesses a monitor.

The FIG. 1 shows expenditure on the Monitor A via the client interface (KSK) through the respective lines, originating from the encrypting decoder or signatures (VSD), which is also connected to the KSS communication interface and to key memory (SS).

The time module (Z) extracts the local date and time, using the university-coordinated time UTC as a time reference, especially the time of the Federal Physics and Technology Office, while the network time protocol can be used for transfer of a time reference from the system to the measurement device/electric meter through a public network.

The time module is connected to the time adaptive module which is also connected to the communication interface (KSS). The outline on FIG. 1 adds the time stamp (ZS) of last measured values from measurement module (M), respectively memory (MS) in the encrypting and/or signature code (VSK); the same is depicted though the bold line from the measurement module/time module to monitor A/ client interface (KSK).

The electric meter's communication to the interface for remote data reading, which is used mainly to calculate the energy from the energy supply company EVU and to the client interface (KSK) for consumption control and verification of EVU's accounts on logical and physical basis is depicted on FIGS. 2 to 5. Data is extracted from a local database or /in the case of strong communication (from a remote database) by a network operator or that sort of reading taker, see FIG. 5. According to the blue-print, no public key is required (for example, a public is 192 Bit=24 Byte bin=48 Hex-symbol), but the available signature method or the private key can be applied. In result, the interface to the electric meter cannot be controlled by the EVU and data cannot leave or be transmitted from there without a public key. Thus, a system is constructed rapidly, where the clients' public keys are not distributed, allowing the clients to check data used in making of their invoices by the means of conventional resources, e.g. through a particular button on the counting device (backward review), as well as the transmission of non-manipulated data to a display or client's computer (see the client's device on FIG. 1). By this, the measurement device/the electric meter is able to get measurement data through the interface (KSS), to check whether they are originating from it, to check whether they are manipulated, and to show the data on display A, i.e. the data that have left the counting device (i.e. the verified relevant part-Metering Board). Furthermore, the open concept can be transmitted through Smart Message Language SML also to the Device Language Message Specification DLMS, which is advantageous.

FIG. 2 shows the configuration design of the electric meter, according to FIG. 1, implemented without a tester and using double optical interface (KSS).

There should be SML-messages from the identification (in the IS memory), measured value (in the MS memory) and a time stamp (in the ZS memory), as well as a signature /in the encrypting and/or signature VSK key of the message, according to the ECC192 method (elliptical cryptographic curve with a 192 Bit signature length) and transfer through the optical interface (KSS). The following functions and components are envisaged:

a time module (Z).
  input time setting SML-communication
  secure storing of the private signature key (EVU is not able to read it), Whereas the optimum scenario envisages:
  a display/monitor A that is able to show date, measured value and time/.

The measurement device/electric meter is able to get SML-messages on the values read, can conduct signature validity test, so this triple link (identification, measured value, time stamp) originates from it and cannot be changed. The value can be showed on display A for a particular period (e.g. 20 seconds) only in such a scenario.

Some clients could require (e.g. with a button on the modem) only values relevant to the calculations to be displayed because the measurement device/electric meter shows only values that are signed by itself, so a manipulation by the client, network operator or electricity supplier is impossible.

The measurement device and the method demonstrate the advantages of simpler processes and lower costs, because data can be stored in not approved devices or systems (and the intermediate data packets or their content is not stored in the measurement device /electric meter). The auditing body confirms clients' trust in the indicator A and client interface (KSS) of the counting device, respectively. There is no need for a management through a signature key, which is implemented through providing a public key in the envelope during the installation of the measurement device/electric meter, which greatly facilitates the options /without key management/ in view of the state of the equipment.

FIG. 3 shows configuration design of the electric meter, according to FIG. 1, implemented with a tester and using optical interface (KSS) to the communication module. Clients' confidence in data showed on display A increases through the availability of a tester in the measurement device/electric meter. The energy counting device requires the values measured that are set in the back/internal part of the interface through activation of the tester /button/. Such request can be conducted through an integrated communication module, e.g. DLC-group (Distribution Line Carrier, power line communication-registration group), through an external modem, through MUC(Multi-Utility-Communication, see product scheme MUC (at present, version 0.60) of FNN (Network equipment forum/network functioning of VDE)) or by the means of another type of communication between a server and a database. Responses are depicted according to FIG. 2. after they are verified by the counting device and are displayed if the counting device/electric meter is able to certify through a signature/key that this values are originating from it and are not manipulated. Therefore, tester installation and data storing location are preferential and do not fall under the relevant permissible sphere of the measurement device/electric meter.

FIG. 4 shows the configuration design of the electric meter, according to FIG. 1, featuring verified data transfer to the client interface or monitor. Such a configuration allows the client to connect a standard display A to the client interface KSK/, or a computer software with a reading/counting cable/next reading/counting unit called client device and provided through a verified source, e.g. consumer protection organization or through the construction market /and data to be verified through reading without using keys. The request by reading unit/client device is conducted through internal/back interface of the measurement device/electric meter to the communication module, DLC-Board or MUC. Responses of this module are verified and transferred further only if the counting device/electric meter verifies their accuracy. Thus, data manipulation is able to occur only outside the client interface /KSK/. The client can have faith in the components because he has access to all of them.

FIG. 5 shows sample implementations of the connection from the measurement device/electric meter to the invention. In the aforementioned implementations, the measurement device/electric meter connects, through the communication interface /KSS/, the management L /e.g. a LAN, local area network/ of the modern /router R, connection W (WAN wide area network; DSL, Powerline and others) to a SM memory; respectively, a database DB of the signed measured values within a computing center RZ of the network operator or the reading taker /this means high level of erudition in the computing center/ and time reference ZR /e.g. NTP-server of PTB in Brownschweig/.

In the implementation showed in the middle of FIG. 5, the measurement devices/electric meters are memorized through an L-network in the nearby area with MUC, which intermediately stores part of the signed measured values into a SM2-memory /e.g. last measured values/, while other part is stored in the client's counting device/electric meter in a SM1-memory; respectively, in database DB of the network operator or the reading taker. Furthermore, energy supply can be cut off remotely through the disconnection device AE, which is managed through a connection section V and external connection /IP, Internet/, WAN-connection (GSM, GPRS, ISDN, Powerline and others), respectively, connected to the main office of the computing center of the network or reading taking operator; hence, remote management devices can be utilized /e.g. within Home Automation/.

In the implementation at the bottom of FIG. 5, is showed an "intelligent" measurement device/electric meter in the relevant part of a measurement device and in the permissible area communication/management module COM or MUC (e.g. featuring SM2-memory for part of the signed measured values). Measurement device/electric meter and COM/ MUC are installed simultaneously in a house. The other measurement devices/electric meters can be connected through an L-network with a nearby area (e.g. M-Bus, Wireless M-Bus, DECT, ZIGBEE (short-range radio-standard for a radio-network of sensors), Bluetooth, Konnex, sensor network or a bus-system with COM or MUC, respectively; and part of the signed values of the client's counting device/electric counter are transferred via WAN, IP to the memory $SM_1$/database DB of the network or reading taking operator, to the computing center/ where they are stored. Data exchange between the central computer/computing main office RZ and the communication/management module /end-device COM can be wired (e.g. Powerline) or wireless while Internet or application protocols should be used for the different types (Windows NT-, Linux-, Unix-protocol from the computing network, or e.g. SMS- or WAP-mobile protocol and others.) Thus, the centralized activation of new functions is made possible, e.g. new rate time, allowing router's functions realization or radio-based remote reading of household counting devices, combined with personal electricity consumption access via a website.

Invention covers all implementations of the device that are functioning in a similar way and is not limited to the depicted and described implementations. The invention's framework allows the invented measurement device to be used, subject to European Patent Legislation EP 1 850 500 A1 of the registration, as a management device which, along with management functions can also assume communication functions (MUC/COM), proving a minimum of a "so called" communication controller, featuring at least one free programmable communication —ALU, through which the management device's interrupt latent time is not directly synchronizing with management functions of the hardware component /e.g. position management activating part/; the data registered can be transmitted through a button of a poly-interface via a protocol agreed with the manufacturer; the lack of valid time is reported in the messages, e.g. another rate without disadvantages for the clients, while the time module Z can be materialized through software and there is no need to plan an exact-time watch RTC (Real Time Clock), featuring fault-reserve; connection to the Security-services of the "intelligent" measurement device/electric meter that is showed on FIG. 5 below can be implemented, e.g. anti-theft sensors, access control devices and time-reading devices, video monitoring and others, or connections of the functions in the household or buildings management, e.g. persiennes and lighting management, as well as management and control of household appliances /in short, Home Automation/ or connection to the automated equipment's additional functions, e.g. management and control of elevators or other electrical systems.

As far as the device is not restricted to the combination of features in claim 1 or 6, it can be defined by another combination of particular features of all disclosed single features. Therefore, during registration, every single feature in claim 1 or 6 can be replaced through at least one other/different single feature.

The invention claimed is:

1. A measurement device (EZ), for communicating with components (SK) of at least one system, which includes a memory (SM) for storing measurement data and which is configured to obtain time information from a time reference (ZR), which comprises said measurement device (EZ) comprising:
   at least a communication interface (KSS) for bidirectional data communication with the system,
   at least one sensor (S) for determining energy measured values or counts,
   at least a measuring module (M), which assigns measurement signals to energy measured values or counts supplied by the at least one sensor (S),
   at least a measurement value memory (MS) for a measurement value, said measurement value being the last determined energy measured value or count,
   a time module (Z) for supplying a time stamp for the last determined energy measured value or count,
   at least a time stamp memory (ZS) for the time stamp,
   at least a time adjustment module (ZA), which is configured to check and adjust the time reference, (ZR) offered by said communication interface (KSS), which was received from the system, to a local time of the time module (Z),
   at least an identification memory (IS) for an identification assigned to said measurement device (EZ),
   at least a key memory (SS) for one or more keys required for encrypting and/or signing, said keys not being public or non-personal keys and not being keys for key management by a trusted authority,
   at least an encryption and/or signature encoder (VSK) that supplies, using the one or more keys in said key memory (SS), information offered to the identification memory (IS), measurement value memory (MS) and time stamp memory (ZS), including a validity and reliability identifier having information for inspecting data integrity, and compiles said information into a current data set and transfers it to at least said communication interface (KSS) for transfer, wherein only one part of a last data set or its content is saved in the measurement device (EZ),
   at least an encryption and/or signature decoder (VSD) that inspects, without key management by a trusted authority, data sets returned via the communication interface (KSS) using the one or more keys in said key memory (SS) for data integrity and identification of the measurement device (EZ) and, upon successful inspection, supplies said data sets for further processing, evaluating or displaying, and
   a management device with program memory for at least managing an indicator (A) configured to display the measurement value in response to a user-controlled query
   wherein the measurement device (EZ) has the capability of identifying measurement data provided from the system via the communication interface (KSS) as its own, and the capability of ruling out manipulation of measurement values without use of public or non-personal keys and keys for key management by a trusted authority.

2. The measurement device according to claim 1, wherein said measurement device (EZ) further comprises a customer interface (KSK), said customer interface (KSK) being configured to hand over data sets checked for data integrity and identification to a client apparatus (KG), which has its own display (KA), or to another apparatus that possesses a monitor.

3. The measurement device according to claim 1, wherein a serial number or a property number is stored in said identification memory (IS).

4. The measurement device according to claim 1, wherein said time module (Z) leads the local time and a date.

5. The measurement device according to claim 1, a world time UTC coordinated by time institutes is used as time reference (ZR).

6. The measurement device according to claim 5, wherein the world time UTC coordinated by time institutes is the UTC (PTB) of the Physical-Technical Federal Institution (Germany).

7. A method for the recognition of manipulations with a measurement device (EZ) without use of public or non-personal keys or key management by a trusted authority, which was approved and/or calibrated, comprising the following method steps:
   generating data packets in the measurement device (EZ) containing at least an identification (IS), a time value (ZS), a measurement value (MS) and a key (SS),
   handing over the data packets to a system or components (SK) of the system, which was not approved and/or was not calibrated, said system or components (SK) storing (SM) and delivering back the data packets or relevant parts on request of the measurement value (MS) to the measurement device (EZ),
   storing the data packets or relevant parts which were delivered back to the measurement device (EZ) from said system or components (SK) and were not previously stored in the measurement device (EZ),
   validating with proven safety by the measurement device (EZ), and not by a trusted authority, the data packets or relevant parts, supplied by said system or components (SK) of said system, on the basis of the key (SS) and a signature if data of the data packets or relevant parts was not modified and came from said measurement device (EZ), said key not being a public or non-personal key and not being a key used for key management by a trusted authority, and
   displaying measurement values on an indicator (A) associated with a management device and program memory in response to a user-controlled query wherein said measurement values displayed on the indicator (A) were approved and/or calibrated, with the same confidence status as measurement values, which did not leave said measurement device (EZ).

8. The method according to claim 7, wherein the successful tested data are provided at an interface (KSK) of said measurement device (EZ) for further processing or evaluation or displaying (A).

9. The method according to claim 7, wherein a Network Time Protocol NTP is used for transmission of a time reference (ZR) of the system over a public network to the measurement device (EZ).

10. The method according to claim 7, wherein the measurement device is an energy counter (EZ).

11. The method according to claim 7, further comprising providing a user-controlled query of measurement values that can be made by a customer interface (KSK) of said measurement device (EZ) and/or by a push button or by a communication/control module (COM) or by a MUC (Multi utility Communication) of said measurement device (EZ).

* * * * *